(12) United States Patent
Morimoto

(10) Patent No.: US 11,993,880 B2
(45) Date of Patent: May 28, 2024

(54) SEWING MACHINE, EMBROIDERY SEWING METHOD OF THE SAME, AND EMBROIDERY SEWING PROGRAM

(71) Applicant: JANOME Corporation, Tokyo (JP)

(72) Inventor: Kiri Morimoto, Tokyo (JP)

(73) Assignee: Janome Corporation, Tokyo (JP)

( * ) Notice: Subject to any disclaimer, the term of this patent is extended or adjusted under 35 U.S.C. 154(b) by 219 days.

(21) Appl. No.: 17/487,577

(22) Filed: Sep. 28, 2021

(65) Prior Publication Data
US 2022/0112640 A1 Apr. 14, 2022

(30) Foreign Application Priority Data
Oct. 8, 2020 (JP) ................................. 2020-170668

(51) Int. Cl.
*D05B 19/12* (2006.01)
*D05C 13/02* (2006.01)
*G05B 19/042* (2006.01)

(52) U.S. Cl.
CPC ............ *D05B 19/12* (2013.01); *D05C 13/02* (2013.01); *G05B 19/042* (2013.01); *G05B 2219/2626* (2013.01)

(58) Field of Classification Search
CPC ........ D05B 19/12; D05B 69/22; D05B 19/10; D05C 13/02; D05C 11/16; D05C 13/06; G05B 2219/2626; G05B 19/042
See application file for complete search history.

(56) References Cited

U.S. PATENT DOCUMENTS

| 4,691,648 A | * | 9/1987 | Hirose | D05B 59/02 112/273 |
| 5,044,292 A | * | 9/1991 | Nakamura | D05B 59/02 112/184 |

(Continued)

FOREIGN PATENT DOCUMENTS

| CN | 111691082 A | 9/2020 |
| DE | 102007021300 A1 | 11/2007 |

(Continued)

OTHER PUBLICATIONS

Japanese Office Action dated Apr. 4, 2024 in corresponding application JP2020-170668.

*Primary Examiner* — Danny Worrell
(74) *Attorney, Agent, or Firm* — Muncy, Geissler, Olds & Lowe, P.C.

(57) ABSTRACT

A sewing machine includes: a pattern data acquisition unit that acquires pattern data in which information on an object corresponding to a unit from a sewing start point to a ravel preventing point or a thread trimming point and information related to a required bobbin thread amount required for sewing the object are associated with each other and registered; a bobbin thread remaining amount acquisition unit that acquires a bobbin thread remaining amount; a determination unit that determines whether or not the object is sewable, based on a difference between a required bobbin thread amount of the object according to the pattern data and the bobbin thread remaining amount; and a decision unit that, based on a determination result of the determination unit, decides whether or not the object is set as a sewing target.

6 Claims, 8 Drawing Sheets

(56) References Cited

U.S. PATENT DOCUMENTS

| | | | | |
|---|---|---|---|---|
| 5,103,750 A * | 4/1992 | Sato | ............... | D05B 59/02 112/475.01 |
| 5,211,121 A * | 5/1993 | Sakakibara | ............ | D05B 59/02 112/278 |
| 5,267,518 A * | 12/1993 | Arnold | ............... | D05B 59/00 112/273 |
| 5,322,029 A * | 6/1994 | Fujita | ............... | D05B 59/02 112/278 |
| 5,339,758 A * | 8/1994 | Fujita | ............... | G01B 7/026 112/278 |
| 2003/0005870 A1 * | 1/2003 | Matsuzawa | ............ | D05B 19/12 112/102.5 |
| 2003/0029365 A1 * | 2/2003 | Butzen | ............... | D05B 57/28 112/273 |
| 2006/0213412 A1 | 9/2006 | Durville et al. | | |
| 2007/0261622 A1 * | 11/2007 | Yoon | ............... | D05B 59/02 112/228 |
| 2007/0272136 A1 * | 11/2007 | Shimizu | ............... | D05B 19/12 112/2 |
| 2010/0154694 A1 * | 6/2010 | Cho | ............... | D05B 59/00 235/375 |
| 2013/0056573 A1 * | 3/2013 | Barea | ............... | D04B 15/50 242/420.5 |
| 2013/0087086 A1 * | 4/2013 | Lizaso | ............... | D05B 69/36 112/273 |
| 2016/0237604 A1 * | 8/2016 | Nakajima | ............ | D05B 63/00 |
| 2022/0112640 A1 * | 4/2022 | Morimoto | ............ | D05B 19/12 |

FOREIGN PATENT DOCUMENTS

| | | |
|---|---|---|
| JP | H 06-154455 A | 6/1994 |
| JP | H08131676 A | 5/1996 |
| JP | H08141234 A | 6/1996 |
| JP | H10192577 A | 7/1998 |
| JP | 2002-102575 A | 4/2002 |
| JP | 2002-248291 A | 9/2002 |
| JP | 3900306 B2 | 1/2007 |
| JP | 4093420 B2 | 3/2008 |

* cited by examiner

FIG. 3

| PATTERN ID | SMALL PATTERN ID | COLOR LAYER ID | OBJECT ID | SEWING ORDER | GROUP SEWING ORDER | REQUIRED BOBBIN THREAD AMOUNT | SEWING START POSITION | THREAD TRIMMING POSITION |
|---|---|---|---|---|---|---|---|---|
| K1 | J1 | C1 | 1a | 1 | – | U1 | P1 | P2 |
| | | C2 | 2a | 1 | – | U2 | P3 | P4 |
| | | C3 | 3a | 1 | – | U3 | P5 | P6 |
| | | | 3b | 2 | | U4 | P7 | P8 |
| | | | 3c | 3 | 1 | U5 | P9 | P10 |
| | | | 3d | | 2 | U6 | P11 | P12 |
| | | | 3e | 4 | – | U7 | P13 | P14 |
| | | C4 | 4a | 1 | – | U8 | P15 | P16 |
| | | | 4b | 2 | – | U9 | P17 | P18 |
| | | *** | *** | *** | *** | *** | *** | *** |
| | J2 | *** | *** | *** | *** | *** | *** | *** |
| | J3 | *** | *** | *** | *** | *** | *** | *** |

FIG. 4
| SMALL PATTERN ID : J1 |||
|---|---|---|
| 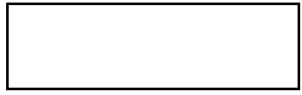 |||
| COLOR LAYER ID | OBJECT ID | SHAPE |
| C1 | 1a | 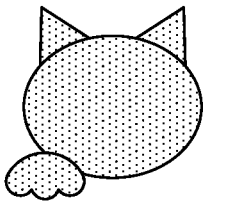 |
| C2 | 2a | CAT |
| C3 | 3a～3d |  |
| C4 | 4a～4n |  |

FIG. 5
| COLOR LAYER ID : C3 ||
|:-:|:-:|
|  ||
| OBJECT ID | SHAPE |
| 3a |  |
| 3b | 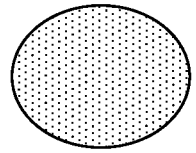 |
| 3c |  |
| 3d |  |
| 3e |  |

SEWING MACHINE, EMBROIDERY SEWING METHOD OF THE SAME, AND EMBROIDERY SEWING PROGRAM

CROSS REFERENCE TO RELATED APPLICATIONS

This application is based on Japanese Patent Application No. 2020-170668 filed Oct. 8, 2020, the contents of which are incorporated herein by reference in its entirety.

TECHNICAL FIELD

The present invention relates to a sewing machine, an embroidery sewing method of the same, and an embroidery sewing program.

BACKGROUND ART

Conventionally known sewing machines can sew an embroidery with a plurality of combined patterns. In such a sewing machine, when the sewing machine runs out of the bobbin thread during embroidery sewing, the user needs to stop the sewing machine, move the sewing position back by several tens of stitches from the stop position, replace the bobbin thread, and then restart the sewing machine.

To reduce such a complex operation, there is provided one proposed technique, for example, that compares the bobbin thread remaining amount with a required bobbin thread amount on a pattern basis or on a color layer basis, and that issues warning display indicating a need of replacing the bobbin thread if the bobbin thread remaining amount is less than the required bobbin thread amount (see, for example, PTL 1).

CITATION LIST

Patent Literature

[PTL 1]
Japanese Patent Application Laid-Open No. H6-154455

SUMMARY

Technical Problem

In recent years, sewable patterns have been increased in its variety and complexity, and the amount of a bobbin thread required for sewing a single pattern tends to increase. Thus, the frequency that the bobbin thread remaining amount becomes less than a required bobbin thread amount for a single pattern tends to increase, and this causes an increase in the frequency of bobbin thread replacement or an increase in waste of bobbin threads.

The present disclosure intends to provide a sewing machine, an embroidery sewing method of the sewing machine, and an embroidery sewing program that can reduce waste of bobbin threads and reduce the frequency of bobbin thread replacement.

Solution to Problem

The first aspect of the present disclosure is a sewing machine including: a pattern data acquisition unit that acquires pattern data in which information on an object corresponding to a unit from a sewing start point to a ravel preventing point or a thread trimming point and information related to a required bobbin thread amount required for sewing the object are associated with each other and registered; a bobbin thread remaining amount acquisition unit that acquires a bobbin thread remaining amount; a determination unit that determines whether or not the object is sewable, based on a difference between a required bobbin thread amount of the object according to the pattern data and the bobbin thread remaining amount; and a decision unit that, based on a determination result of the determination unit, decides whether or not the object is set as a sewing target.

The second aspect of the present disclosure is an embroidery sewing method of a sewing machine performed by a computer, and the method includes steps of: acquiring pattern data in which information on an object corresponding to a unit from a sewing start point to a ravel preventing point or a thread trimming point and information related to a required bobbin thread amount required for sewing the object are associated with each other and registered; acquiring a bobbin thread remaining amount; determining whether or not the object is sewable, based on a difference between a required bobbin thread amount of the object according to the pattern data and the bobbin thread remaining amount; and based on a determination result, deciding whether or not the object is set as a sewing target.

The third aspect of the present disclosure is an embroidery sewing program of a sewing machine for causing a computer to perform processes of: acquiring pattern data in which information on an object corresponding to a unit from a sewing start point to a ravel preventing point or a thread trimming point and information related to a required bobbin thread amount required for sewing the object are associated with each other and registered; acquiring a bobbin thread remaining amount; determining whether or not the object is sewable, based on a difference between a required bobbin thread amount of the object according to the pattern data and the bobbin thread remaining amount; and based on a determination result, deciding whether or not the object is set as a sewing target.

The present disclosure achieves advantageous effects that can reduce waste of bobbin threads and the frequency of bobbin thread replacement.

BRIEF DESCRIPTION OF DRAWINGS

FIG. 3 is a diagram illustrating one example of pattern data according to one embodiment of the present disclosure.

FIG. 4 is a diagram illustrating one example of compositions of respective color layers forming a small pattern ID "J1" in the pattern data illustrated in FIG. 3.

FIG. 5 is a diagram illustrating one example of compositions of respective objects forming a color layer ID "C3" in the pattern data illustrated in FIG. 3.

DESCRIPTION OF EMBODIMENTS

A sewing machine, an embroidery sewing method of the sewing machine, and an embroidery sewing program according to one embodiment of the present disclosure will be described below with reference to the drawings.

Figure 1:
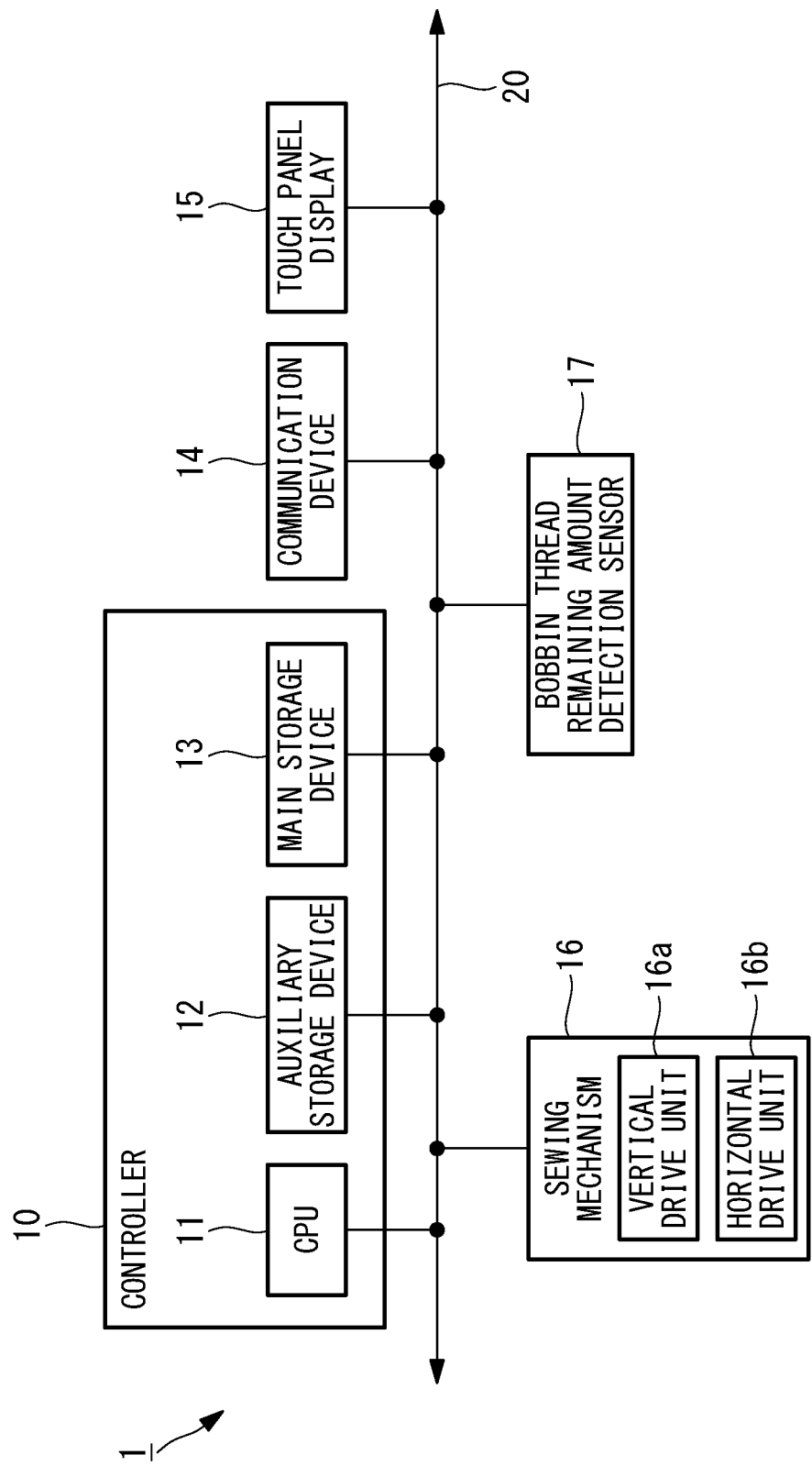
FIG. 1 is a schematic configuration diagram illustrating one example of a hardware configuration included in a sewing machine according to one embodiment of the present disclosure.

FIG. 1 is a schematic configuration diagram illustrating one example of a hardware configuration included in a sewing machine 1 according to one embodiment of the present disclosure. As illustrated in FIG. 1, the sewing machine 1 includes a controller 10, a communication device 14, a touch panel display 15, a sewing mechanism 16, a bobbin thread remaining amount detection sensor 17, and the like, for example. These components are connected via a bus 20, for example.

The controller 10 includes a CPU 11, an auxiliary storage device 12 for storing a program executed by the CPU 11, data referenced by the program, or the like, and a main storage device 13 that functions as a work area during execution of each program, for example.

An example of the auxiliary storage device 12 may be a magnetic disk such as a hard disk drive (HDD), a magneto-optical disk, a semiconductor memory such as a solid state drive (SSD), or the like.

The communication device 14 is connected to a predetermined connection target (for example, a server) via a network such as the Internet and implements intercommunication with the connection target. The communication device 14 is controlled based on an instruction from the controller 10.

The touch panel display 15 is configured such that a touch panel is overlapped with a display such as a liquid crystal display (LCD) or an organic light emitting diode (OLED), for example. The touch panel display 15 functions as an input unit used by the user to provide an instruction to the sewing machine 1 and a display unit that displays information. Instead of the touch panel display 15, a configuration in which the input unit and the display unit are separately provided may be employed.

The information displayed on the touch panel display 15 is controlled by the controller 10. Information input via the touch panel display 15 is output to the controller 10, and various processes based on the input information are performed by the controller 10.

For example, the touch panel display 15 is configured to display a plurality of registered patterns as choices and enable the user to select a desired pattern from the plurality of displayed patterns. Information on a pattern selected by the user, in other words, a pattern ID (see FIG. 3) is output to the controller 10.

The sewing mechanism 16 is a machine mechanism for stitch formation and includes a vertical drive unit 16a used for driving a sewing needle vertically and a horizontal drive unit 16b used for moving the sewing point of the sewing needle on a horizontal plane, for example.

The vertical drive unit 16a has a motor used for driving a sewing needle vertically, for example. The horizontal drive unit 16b includes a motor used for moving the sewing point of the sewing machine in the X-axis direction and a motor used for moving the sewing point of the sewing machine in the Y-axis direction.

These motors are driven based on instructions from the controller 10 to move the sewing needle vertically for a desired sewing point (a desired coordinate point defined by the XY coordinate system, for example), this causes a needle thread and a bobbin thread to be intertwined, and a desired stitch or pattern is formed in a sewn object.

Note that, since the sewing mechanism 16 is well known and is a well-known mechanism, the detailed description thereof will be omitted here.

The bobbin thread remaining amount detection sensor 17 is provided in a bobbin thread supply unit (not illustrated) included in the sewing mechanism 16, for example, and detects and outputs the bobbin thread remaining amount of a currently loaded bobbin. For example, a known configuration can be employed for the bobbin thread remaining amount detection sensor 17, and a sensor having the configuration disclosed in Japanese Patent Application Laid-Open No. H1-126996 can be employed as an example.

Figure 2:
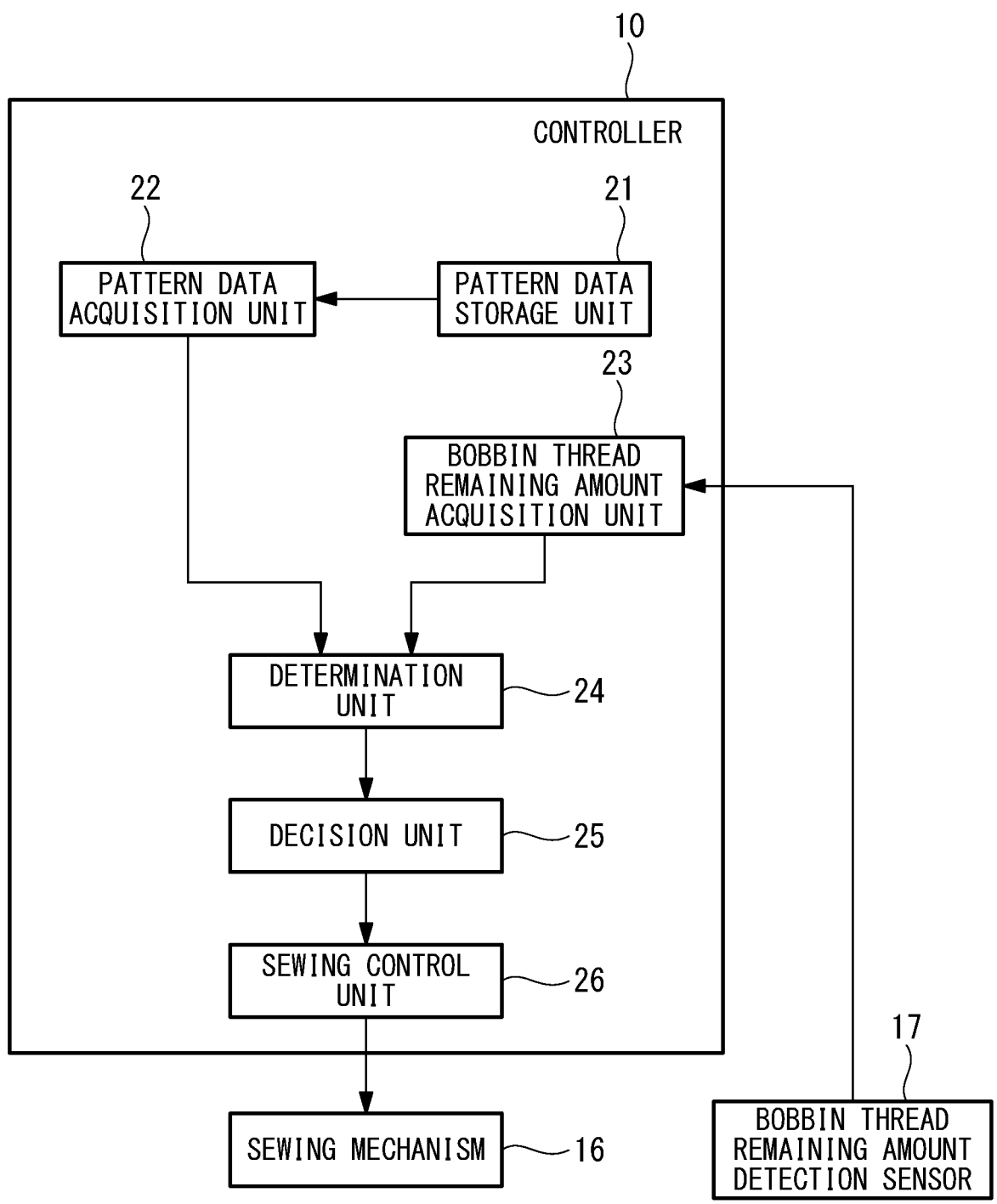
FIG. 2 is a function block diagram illustrating one extracted example of an embroidery sewing function out of various functions included in the sewing machine according to one embodiment of the present disclosure.

FIG. 2 is a function block diagram illustrating one extracted example of an embroidery sewing function out of various functions included in the sewing machine 1 according to the present embodiment.

All or some of the functions described below are implemented by processing circuitry, for example. A series of processes for implementing various functions described below are stored in the auxiliary storage device 12 in a form of a program (for example, an embroidery sewing program) as an example, and various functions are implemented when the CPU 11 loads the program into the main storage device 13 and performs information processing and computational processing. A program may be installed in advance in the auxiliary storage device 12, a program may be provided in a state of being stored in another computer readable storage medium, or a program may be delivered via a wired or wireless communication unit. The computer readable storage medium is a magnetic disk, a magneto-optical disk, a CD-ROM, a DVD-ROM, a semiconductor memory, or the like.

As illustrated in FIG. 2, the controller 10 of the sewing machine 1 includes a pattern data storage unit 21, a pattern data acquisition unit 22, a bobbin thread remaining amount acquisition unit 23, a determination unit 24, a decision unit 25, and a sewing control unit 26, for example.

A plurality of pattern data is stored in the pattern data storage unit 21. In the present embodiment, one pattern is formed of at least one small pattern. A small pattern is formed of at least one object. An object corresponds to a unit from a sewing start point to a ravel preventing point or a thread trimming point, for example. Further, information required for sewing each pattern configured in such a way is registered in the pattern data.

FIG. 3 is a diagram illustrating one example of the pattern data according to the present embodiment.

As illustrated in FIG. 3, pattern IDs each for identifying a pattern, small pattern IDs each for identifying a small pattern forming a pattern, object IDs (information on objects) each for identifying an object forming a small pattern, and information related to a required bobbin thread amount required for sewing an object are associated with each other and registered in the pattern data.

Herein, the "information related to a required bobbin thread amount" is information required for obtaining a required bobbin thread amount and may be, for example, data required for calculating a required bobbin thread amount (for example, needle location point information or the like) in addition to the "required bobbin thread amount" itself.

Furthermore, color layer IDs each for identifying color information on a needle thread used for a small pattern are registered in the pattern data.

Furthermore, object IDs and sewing order are associated with each other and registered in the pattern data. Information on an object group formed of a plurality of objects whose sewing order is unable to be interchanged and a sewing order of respective objects in the object group are registered in the pattern data.

In the pattern data illustrated in FIG. 3, a pattern identified by a pattern ID "K1" is formed of small patterns identified by small pattern IDs "J1" to "J3". A small pattern identified by the small pattern ID "J1" is formed of colors identified by color layer IDs "C1 to C4". The small pattern identified by the small pattern ID "J1" is formed of objects identified by object IDs "1a", "2a", "3a" to "3e", "4a", "4b", and the like.

Furthermore, in the pattern data illustrated in FIG. 3, a sewing order of respective objects is registered on a color layer basis. For example, in a case of the color layer ID "C3", the default sewing order is registered in the order of object IDs "3a", "3b", "3c", "3d", and "3e". In the pattern data illustrated in FIG. 3 as an example, the objects identified by the object IDs "3c" and "3d" are registered as an object group for which the sewing order is not rearrangeable, and it is registered that the object of the object ID "3d" is sewn after the object of the object ID "3c" is sewn.

In the pattern data, required bobbin thread amounts, sewing start positions, and thread trimming positions are registered on an object ID basis. In addition to these pieces of information, information on a sewing trace may be registered on an object ID basis.

FIG. 4 and FIG. 5 are diagrams each illustrating an example of small pattern compositions corresponding to the pattern data illustrated in FIG. 3. As illustrated in FIG. 4, for example, a small pattern identified by a small pattern ID "J1" is a pattern of a small cat holding a frame with letters "CAT" printed thereon by both the hands and is formed of four color layers.

The component of the frame identified by the object ID "1a" is sewn with a needle thread of the color identified by the color layer ID "C1".

The letters "CAT" identified by the object ID "2a" are sewn with a needle thread of the color identified by the color layer ID "C2".

The respective components of the cat identified by the object IDs "3a" to "3d" are sewn with a needle thread of the color identified by the color layer ID "C3", and the components of the cat face identified by the object IDs "4a" to "4n" are sewn with a needle thread of the color identified by the color layer ID "C4".

As illustrated in FIG. 5, the components of the cat sewn with the needle thread of the color layer ID "C3" are formed of components of two ears, one face, and two hands, and object IDs of the objects "3a" to "3d" are provided to respective components.

With reference back to FIG. 2, the pattern data acquisition unit 22 acquires pattern data corresponding to a pattern specified by the user out of the plurality of pattern data stored in the pattern data storage unit 21. For example, when the user operates the touch panel display 15 to specify a pattern identified by the pattern ID "K1", the pattern data acquisition unit 22 reads pattern data of the specified pattern ID "K1" from the pattern data storage unit 21.

The bobbin thread remaining amount acquisition unit 23 acquires a bobbin thread remaining amount detected by the bobbin thread remaining amount detection sensor 17.

The determination unit 24 determines whether or not the object is sewable, and this determination is based on a difference between a required bobbin thread amount for an object according to pattern data acquired by the pattern data acquisition unit 22 and the bobbin thread remaining amount acquired by the bobbin thread remaining amount acquisition unit 23.

If a required bobbin thread amount itself is registered in the pattern data, the determination unit 24 performs the determination by using the required bobbin thread amount. If information for calculating a required bobbin thread amount is registered, the determination unit 24 calculates a required bobbin thread amount by performing operation based on the information. For example, if needle location point information is registered, a required bobbin thread amount is calculated by accumulating relative movement of stitch data to find the sewing distance and multiplying this sewing distance by a predetermined constant. When a required bobbin thread amount required for one stitch is fixed in advance, a required bobbin thread amount may be calculated by multiplying this fixed amount by the number of stitches.

If the bobbin thread remaining amount acquired by the bobbin thread remaining amount acquisition unit 23 is greater than or equal to the required bobbin thread amount for an object, the determination unit 24 determines that the sewing is possible, and if the bobbin thread remaining amount is less than the required bobbin thread amount for the object, the determination unit 24 determines that the sewing is not possible.

For example, in accordance with the sewing order of respective objects, the determination unit 24 determines on an object basis whether or not sewing is possible.

Furthermore, if an object group in which the sewing order of objects is unable to be interchanged is registered in the pattern data acquired by the pattern data acquisition unit 22, the determination unit 24 determines on an object basis in accordance with the sewing order whether or not sewing is possible for a plurality of objects belonging to the object group, and if it is determined that sewing is not possible for any of the objects, the determination unit determines that sewing is also not possible for the object whose sewing order is set subsequent to the object determined to be not sewable.

For example, the objects of the object IDs "3c" and "3d" illustrated in FIG. 3 and FIG. 5 are registered as an object group. Therefore, if the determination unit 24 determines that sewing is not possible for the object ID "3c", for example, the determination unit 24 automatically determines that sewing is also not possible for the object ID "3d".

Based on a determination result of the determination unit 24, the decision unit 25 decides whether or not to set the object as a sewing target. Thus, the decision unit 25 sets, as a sewing target, an object determined by the determination unit 24 to be sewable and outputs the object ID of the sewing target to the sewing control unit 26. The object determined by the determination unit 24 to be not sewable is excluded from sewing targets.

The sewing control unit 26 acquires information on an object decided as a sewing target. Specifically, the sewing control unit 26 acquires, from the pattern data, information on a sewing start position, a thread trimming position, a sewing trace of the object, or the like, to control the sewing mechanism 16 based on the acquired information. Specifically, the sewing control unit 26 controls the vertical drive unit 16a, the horizontal drive unit 16b, or the like illustrated in FIG. 1 and performs sewing on an object basis.

Figure 6:
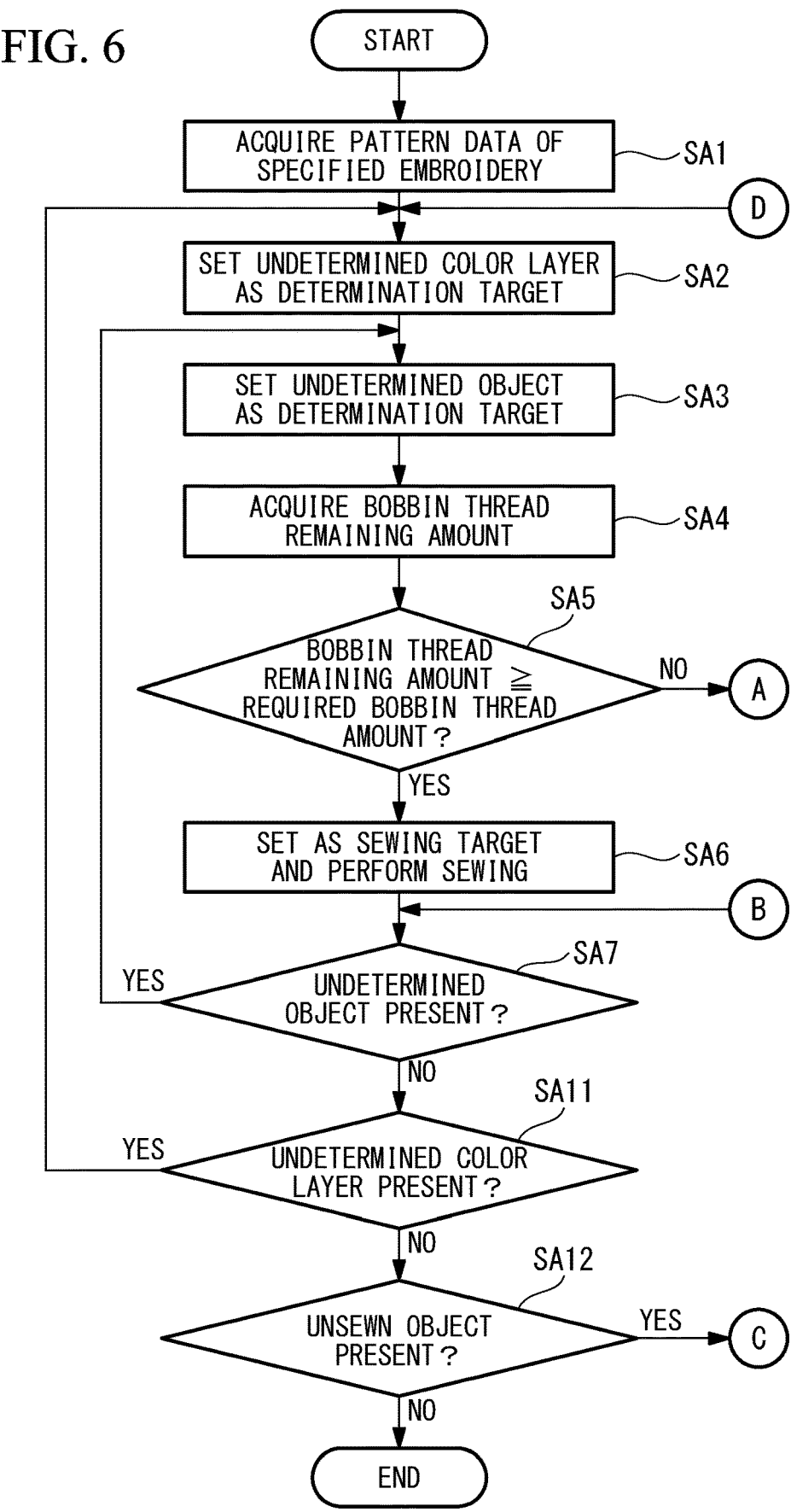
FIG. 6 is a flowchart illustrating one example of a procedure of an embroidery sewing method according to one embodiment of the present disclosure.
Figure 7:
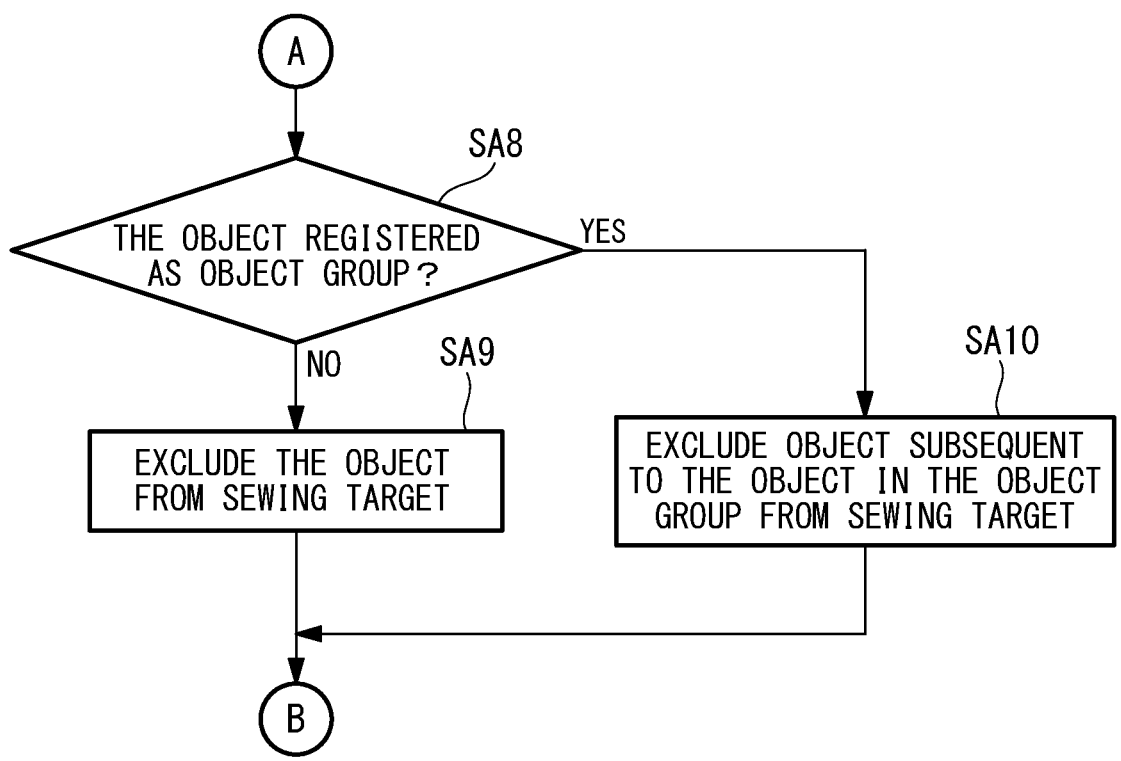
FIG. 7 is a flowchart illustrating one example of a procedure of the embroidery sewing method according to one embodiment of the present disclosure.
Figure 8:
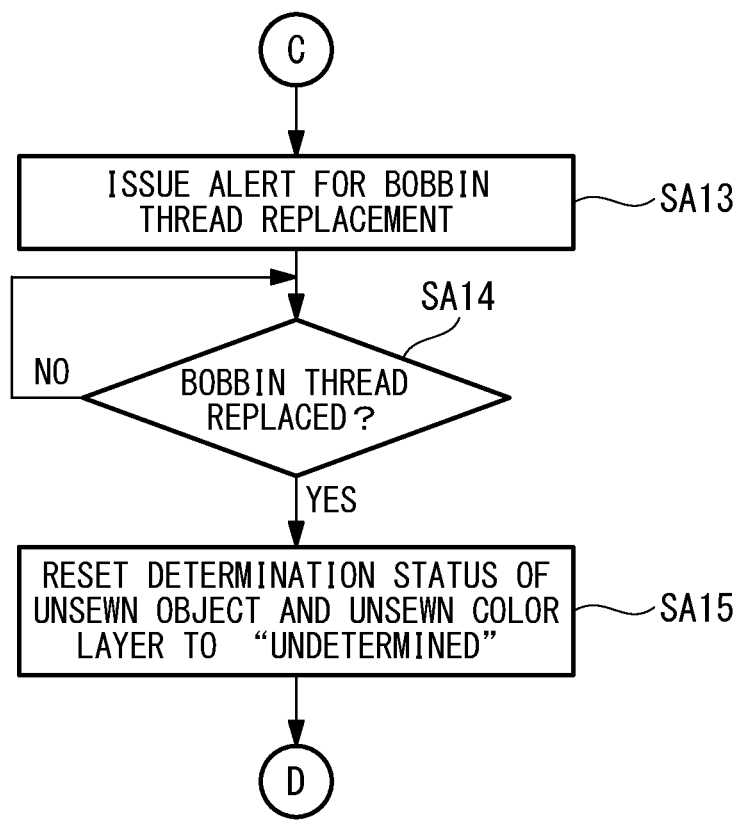
FIG. 8 is a flowchart illustrating one example of a procedure of the embroidery sewing method according to one embodiment of the present disclosure.

Next, an embroidery sewing method according to the present embodiment will be described with reference to FIG. 6 to FIG. 8. FIG. 6 to FIG. 8 are flowcharts each illustrating an example of the procedure of the embroidery sewing method according to the present embodiment. Each process illustrated in FIG. 6 to FIG. 8 is performed when the CPU 11 described above loads the embroidery sewing program stored in the auxiliary storage device 12 into the main storage device 13 and performs information processing and computational processing, for example.

First, in response to a user operation on the touch panel display 15, a pattern desired by the user is specified, and in response to input of an instruction of starting sewing, pattern data of the specified pattern is acquired from the pattern data storage unit 21 (SA1).

Next, out of color layers registered in the pattern data, an undetermined color layer is set as a determination target, and the determination status of the color layer set as the determination target is set to "determined" (SA2). With the determination status being set in such a way, a determined color layer and an undetermined color layer can be distinguished from each other.

Herein, when the sewing order is set on a color layer basis, a color layer that becomes a determination target may be set in accordance with the sewing order.

Subsequently, in the color layer set as a determination target, the undetermined object is set as a determination target, and the determination status of the object set as the determination target is set to "determined" (SA3). With the determination status being set in such a way, a determined object and an undetermined object can be distinguished from each other.

Herein, when the sewing order is set on an object basis, an object that becomes a determination target may be set in accordance with the sewing order.

Subsequently, the current bobbin thread remaining amount is acquired (SA4), the acquired bobbin thread remaining amount is compared with a required bobbin thread amount for the object of the determination target (SA5). If the bobbin thread remaining amount is greater than or equal to the required bobbin thread amount (YES in SA5), the object of the determination target is decided as a sewing target, and sewing of the object is performed (SA6). Further, the sewing status of the sewn object is set to "sewn". With the sewing status being set in such a way, a sewn object and an unsewn object can be distinguished from each other.

Subsequently, it is determined whether or not an undetermined object is present in the color layer set as the determination target (SA7). If an undetermined object is present (YES in SA7), the process returns to step SA3 to set the undetermined object as a determination target and repeats the subsequent process.

In step SA5, if the bobbin thread remaining amount is less than the required bobbin thread amount for the object of the determination target (NO in SA5), it is then determined whether or not the object of the determination target is registered as an object group (step SA8 of FIG. 7). In other words, it is determined whether or not the object of the determination target is an object whose sewing order is unable to be interchanged. If it is determined that the object of the determination target is not registered as an object group (NO in SA8), the object of the determination target is determined to be not sewable and excluded from sewing targets (SA9). The process then proceeds to step SA7 of FIG. 6 without performing sewing of the object, and the subsequent process is performed. Further, since no sewing is performed on the object, the sewing status is maintained as "unsewn".

On the other hand, if it is determined that the object of the determination target is registered as an object group in step SA8 of FIG. 7 (YES in SA8), it is determined that, in the object group, none of the objects subsequent to the object of the determination target is sewable, and all these objects are excluded from sewing targets (SA10). The process then proceeds to step SA7 of FIG. 6 without performing sewing of these objects. Accordingly, if the determination target is registered as an object group, then, out of the plurality of objects belonging to the object group, all the objects whose sewing order is set subsequent to the object of the determination target are excluded from sewing targets, and no sewing will be performed thereon. The determination status of the object excluded from the sewing target in such a way is set to "determined", and the sewing status is set to "unsewn".

Subsequently, if it is determined that no undetermined object is present in step SA7 of FIG. 6 (NO in SA7), it is determined whether or not an undetermined color layer is present (SA11). If an undetermined color layer is present, the process returns to step SA2, and the subsequent process is performed. On the other hand, if it is determined that no undetermined color layer is present (NO in SA11), it is determined whether or not an unsewn object is present (SA12). In other words, it is determined whether or not an object that has been excluded from sewing targets and has not yet been sewn is present. If an unsewn object is present, the process proceeds to step SA13 of FIG. 8 to issue an alert for bobbin thread replacement. The alert for bobbin thread replacement is performed by displaying a message that urges the user to replace the bobbin thread, such as a message "Please replace the bobbin thread", on the touch panel display 15, for example. Otherwise, the alert may be issued by voice.

If the bobbin thread is replaced by the user in response to the alert (YES in SA14), the determination status of the object and the color layer having the sewing status of "unsewn" is reset to "undetermined" (SA15), the process returns to step SA2 of FIG. 6, and the subsequent process is performed. Accordingly, comparison with the bobbin thread remaining amount is performed again for the unsewn color layer or object, and an object that can be sewn with the current bobbin thread remaining amount will be sewn. If sewing of all the objects is completed (NO in SA12), the present process ends.

Next, the embroidery sewing method in the present embodiment will be briefly described with an example of a case of performing embroidery for a small pattern for the small pattern ID "J1" of the pattern data illustrated in FIG. 3. Further, for simplified illustration, description is started from a process after sewing for the object IDs "1a" and "2a" has been performed and the color layer ID "C3" has been set as a determination target because the bobbin thread remaining amount is sufficient for the color layer IDs "C1" and "C2" due to the repeatedly performed steps SA2 to SA11 of FIG. 6.

In such a case, first, the color layer ID "C3" is set as a determination target (SA2), and the object ID "3a" is set as a determination target (SA3). Subsequently, the current bobbin thread remaining amount is acquired (SA4), and the bobbin thread remaining amount is compared with a required bobbin thread amount "U3" (SA5). If the bobbin thread remaining amount is greater than the required bobbin thread amount "U3" (YES in SA5), sewing of the object ID "3a" is performed (SA6). Subsequently, since undetermined objects "3b" to "3e" are present for the color layer ID "C3", the determination of step SA7 is YES (YES in SA7), and the object ID "3b" is set as a determination target (SA3). Subsequently, the current bobbin thread remaining amount is acquired (SA4), and the bobbin thread remaining amount is compared with a required bobbin thread amount "U4" (SA5). If the bobbin thread remaining amount is greater than the required bobbin thread amount "U4" (YES in SA5), sewing for the object ID "3b" is performed (SA6). Subsequently, the determination is again YES in step SA7 (YES in SA7), and the object ID "3c" is set as a determination target (SA3).

Subsequently, the current bobbin thread remaining amount is acquired (SA4), and the bobbin thread remaining amount is compared with a required bobbin thread amount "U5" (SA5). If it is determined that the bobbin thread remaining amount is less than the required bobbin thread amount "U5" (NO in SA5), it is then determined whether or not the object of the determination target is registered as an object group (SA8 of FIG. 7). Since the object ID "3c" that is the determination target is registered as an object group (YES in SA8), the object ID "3d" whose sewing order is set subsequent to the object ID "3c" in the object group is also excluded from sewing targets (SA10).

Accordingly, sewing is not performed for the object IDs "3c" and "3d", the determination is YES in the subsequent step SA7 of FIG. 6 (YES in SA7), and the subsequent object ID "3e" is set as a determination target (SA3). Subsequently, the current bobbin thread remaining amount is acquired (SA4), and the bobbin thread remaining amount is compared with a required bobbin thread amount "U7" (SA5). If the bobbin thread remaining amount is greater than the required bobbin thread amount "U7" (YES in SA5), sewing for the object ID "3e" is performed (SA6). Subsequently, the determination is NO in step SA7 because the determination has been performed on all the objects for the color layer "C3" (NO in SA7), the determination is YES in the subsequent step SA11 because the color layer "C4" has not yet been determined (YES in SA11), and the color layer ID "C4" is set as a determination target.

The same process also proceeds for the color layer "C4", and the sewing is performed due to the determination that the bobbin thread remaining amount is greater than or equal to the required bobbin thread amount for all the object IDs "4a" to "4n", this results in determination of YES in both of steps SA7 and SA11, and the process proceeds to step SA12.

In step SA12, the determination is YES because of the object IDs "3c" and "3d" remaining unsewn, the process proceeds to step SA13 of FIG. 8, and an alert for bobbin thread replacement is issued. Then, in response to replacement of the bobbin thread (YES in SA14), the determination status of the object IDs "3c" and "3d" for unsewn objects and the color layer ID "C3" to which these object IDs belong is reset to "undetermined" (SA15), and the process returns to step SA2 of FIG. 6.

The color layer ID "C3" for the undetermined color layer is then set as a determination target (SA2), and subsequently, the object ID "3c" for the undetermined object is set as a determination target (SA3). The bobbin thread remaining amount is then acquired (SA4), and the bobbin thread remaining amount is compared with the required bobbin thread amount (SA5). Since the bobbin thread has just been replaced, it is determined that the bobbin thread remaining amount is greater than or equal to the required bobbin thread amount (YES in SA5), and sewing for the object ID "3c" is performed (SA6). Then, in step SA7, the determination is YES because the undetermined object is present, the same process is performed also for the object ID "3d", and sewing is performed. Then, in response to completion of sewing for all the objects forming the small pattern of the small pattern ID "J1", the determination is NO in step SA11 and step SA12, and the present process ends.

As described above, according to the sewing machine, the embroidery sewing method of the sewing machine, and the embroidery sewing program of the present embodiment, whether or not sewing is possible is determined by comparing the bobbin thread remaining amount with a required bobbin thread amount on an object basis where the object corresponds to a unit from a sewing start point to a ravel preventing point or a thread trimming point. This can reduce waste of bobbin threads and the frequency of bobbin thread replacement, as compared to the conventional scheme of comparing the bobbin thread remaining amount with a required bobbin thread amount on a pattern basis where the pattern is formed of a plurality of objects.

Conventionally, a small pattern or a color layer of the present embodiment is defined as the minimum unit, and on such a unit basis, the bobbin thread remaining amount is compared with the required bobbin thread amount to determine whether or not sewing is possible. For example, when the pattern of the small pattern ID "J1" illustrated in FIG. 4 is referenced as an example, a small pattern formed of the object IDs "1a", "2a", "3a" to "3d", and "4a" to "4n" or each of the color layers "C1" to "C4" is defined as the minimum unit, and on such a unit basis, the bobbin thread remaining amount is compared with a required bobbin thread amount to determine whether or not sewing is possible. Thus, for example, when there is no bobbin thread remaining amount sufficient for collectively sewing all the object IDs "3a" to "3d" forming the color layer ID "C3", the bobbin thread is required to be replaced at this time. In contrast, according to the sewing machine, the embroidery sewing method of the sewing machine, and the embroidery sewing program of the present embodiment, an "object", which is further subdivided from a small pattern or a color layer, is used as the minimum unit to compare the bobbin thread remaining amount with a required bobbin thread amount and proceed with sewing. This can reduce waste of bobbin threads and the frequency of bobbin thread replacement, as compared to the conventional case described above.

Furthermore, according to the present embodiment, information on an object group formed of a plurality of objects whose sewing order is unable to be interchanged and the sewing order in the object group are registered in pattern data. Further, out of the plurality of objects belonging to the same object group, if an object whose bobbin thread remaining amount is determined to be less than a required bobbin thread amount is present, the subsequent object is excluded from sewing targets. Accordingly, sewing can be performed for a plurality of objects belonging to the same object group without rearrangement of the sequence of the registered sewing order.

Furthermore, according to the present embodiment, object information and a color layer are associated with each other and registered in pattern data, and if an undetermined object whose required bobbin thread amount is less than or equal to the bobbin thread remaining amount is no longer present in the color layer set as a determination target, another undetermined color layer is set as a determination target to continue the determination on an object basis as to whether or not sewing is possible. Accordingly, it is possible to find a sewable object across a plurality of color layers, and it is possible to use a bobbin thread more effectively and further reduce waste of the bobbin thread as compared to a case where the determination ends with a single color layer.

Although the present disclosure has been described above with reference to the embodiment, the technical scope of the present disclosure is not limited to the scope described in the above embodiment. Various changes or improvements can be applied to the above embodiment within a scope not departing from the spirit of the present disclosure, and a form to which the change or the improvement is applied is also included in the technical scope of the present disclosure.

The flow of the embroidery sewing method described in the above embodiment is also an example. An unnecessary step may be deleted, a new step may be added, or the processing order may be rearranged within a scope not departing from the spirit of the present disclosure.

For example, in the embodiment described above, the determination as to whether or not sewing is possible and the performance of sewing are alternatingly performed such that it is determined on an object basis whether or not an object is a sewing target and sewing of the object is performed if it is decided to be a sewing target. However, without being limited to such an example, determination on an object basis as to whether or not sewing is possible may be continuously performed, and after the determination as to whether or not the object is a sewing target is completed for all the objects forming a small pattern, sewing of the objects set as the sewing targets may be collectively performed. In such a case, the bobbin thread remaining amount can be estimated by subtracting, each time, the accumulated totals of required bobbin thread amounts for the objects determined as sewing targets from the bobbin thread remaining amounts acquired at the time of start of the determination.

Although the case where pattern data is stored in the pattern data storage unit 21 included in the sewing machine 1 has been described as an example in the present embodiment, a storage place of the pattern data is not particularly limited. For example, pattern data may be stored in a particular server connected to a network, and the pattern data acquisition unit 22 may acquire desired pattern data by downloading the pattern data from this server via the network. The pattern data may be stored in a computer readable storage medium (for example, a magnetic disk, a magneto-optical disk, a CD-ROM, a DVD-ROM, a semiconductor memory, or the like) that can be attached to or detached from the sewing machine 1, and a configuration in which the pattern data acquisition unit 22 acquires pattern data with such a storage medium being connected to the sewing machine 1 may be employed.

The sewing machine of the embodiment described above is understood as follows, for example.

The sewing machine according to the present disclosure includes: a pattern data acquisition unit that acquires pattern data in which information on an object corresponding to a unit from a sewing start point to a ravel preventing point or a thread trimming point and information related to a required bobbin thread amount required for sewing the object are associated with each other and registered; a bobbin thread remaining amount acquisition unit that acquires a bobbin thread remaining amount; a determination unit that determines whether or not the object is sewable, based on a difference between a required bobbin thread amount of the object according to the pattern data and the bobbin thread remaining amount; and a decision unit that, based on a determination result of the determination unit, decides whether or not the object is set as a sewing target.

According to the above configuration, information on an object corresponding to one unit from a sewing start point to a ravel preventing point or a thread trimming point and a required bobbin thread amount required for sewing the object are registered in pattern data. Then, in the determination unit, based on a difference between the required bobbin thread amount and the bobbin thread remaining amount, it is determined on an object basis whether or not sewing is possible, and based on the determination result, it is decided by the decision unit whether or not the object is set as a sewing target.

In this way, it is decided on an object basis whether or not an object is set as a sewing target. This can reduce waste of bobbin threads and the frequency of bobbin thread replacement, as compared to the conventional scheme of comparing the bobbin thread remaining amount with a required bobbin thread amount on a pattern basis where the pattern is formed of a plurality of objects.

The above "information related to a required bobbin thread amount" may be data required for calculating a required bobbin thread amount (for example, needle location point information or the like) in addition to the "required bobbin thread amount" itself.

In the sewing machine according to the present disclosure, the information on the object and sewing order may be associated with each other and registered in the pattern data, the determination unit may determine in accordance with the sewing order whether or not the object is sewable, and the decision unit may exclude the object determined to be not sewable from sewing targets.

According to the above configuration, information on the object and sewing order are associated with each other in the pattern data. In the determination unit, in accordance with the sewing order, it is determined on an object basis whether or not sewing is possible, and the object determined to be not sewable is excluded from sewing targets by the decision unit. Accordingly, the object determined by the determination unit to be not sewable is skipped from the sewing order, and only the object determined to be sewable is sewn in accordance with the sewing order.

In the sewing machine according to the present disclosure, information on an object group formed of a plurality of objects whose sewing order is unable to be interchanged and the sewing order in the object group may be registered in the pattern data. In accordance with the sewing order, the determination unit may determine on an object basis whether or not sewing is possible for each of the objects belonging to the object group, and when it is determined that sewing is not possible for any of the objects, the determination unit may determine that sewing is not possible for an object subsequent to the object determined to be not sewable.

According to the above configuration, information on an object group formed of a plurality of objects whose sewing order is unable to be interchanged and the sewing order in the object group are registered in pattern data. For the plurality of objects belonging to the same object group, it is determined on an object basis sequentially in accordance with the sewing order by the determination unit whether or not sewing is possible. If an object determined to be not sewable is present, it is determined that sewing is also not possible for the subsequent object. Accordingly, sewing can be performed for a plurality of objects belonging to the same object group without rearrangement of the sequence of the registered sewing order.

In the sewing machine according to the present disclosure, a color layer formed of the objects of the same color and information on the objects forming the color layer may be associated with each other and registered in the pattern data, and the determination unit may select any of the color layer as a determination target, and in the selected color layer, determine on an object basis whether or not sewing is possible. When an unsewn object whose required bobbin thread amount is less than or equal to a bobbin thread remaining amount is no longer present in the color layer that is a determination target, the determination unit may select another unsewn color layer as the determination target.

According to the above configuration, object information and a color layer are associated with each other and registered in pattern data. In the determination unit, any color layer is selected as a determination target, and it is determined on an object basis whether or not sewing is possible for objects belonging to the selected color layer. In the selected color layer, if an unsewn object whose required bobbin thread amount is less than or equal to the bobbin thread remaining amount is no longer present, another unsewn color layer is selected as a determination target. In this color layer, it is also determined on an object basis whether or not sewing is possible. Accordingly, it is possible to find a sewable object across a plurality of color layers, and it is possible to use a bobbin thread more effectively and further reduce waste of the bobbin thread as compared to a case where the determination ends with a single color layer.

REFERENCE SIGNS LIST 1 sewing machine
10 controller
11 auxiliary storage device
12 main storage device
13 communication device
14 touch panel display
15 sewing mechanism
16a vertical drive unit
16b horizontal drive unit
17 bobbin thread remaining amount detection sensor
21 pattern data storage unit
22 pattern data acquisition unit
23 bobbin thread remaining amount acquisition unit
24 determination unit
25 decision unit
26 sewing control unit

The invention claimed is:

1. A sewing machine, comprising:
a memory storing a program; and
a processor configured to execute the program to:
acquire pattern data in which information on an object corresponding to a unit from a sewing start point to a ravel preventing point or a thread trimming point and information related to a required bobbin thread amount required for sewing the object are associated with each other and registered, the information on the object and sewing order being associated with each other and registered in the pattern data;
acquire a bobbin thread remaining amount;
set one of the objects as a determination target in accordance with the sewing order;
determine whether or not the object of the determination target is sewable, based on a difference between the required bobbin thread amount of the object of the determination target according to the pattern data and the bobbin thread remaining amount, and
exclude the object of the determination target from sewing targets when the object of the determination target is determined not to be sewable, and set another object in the next sewing order as the object of the determination target without warning for a shortage of the bobbin thread.

2. The sewing machine according to claim 1,
wherein information on an object group formed of a plurality of objects whose sewing order is unable to be interchanged and a sewing order in the object group are registered in the pattern data,
wherein the processor is configured to execute the program to:
determine whether or not the object of the determination target is registered as the object group when the object of the determination target is determined not to be sewable, and
exclude, out of objects belonging to the object group, all the objects whose sewing order is set subsequent to the object of the determination target from the sewing targets when the object of the determination target is registered as the object group.

3. The sewing machine according to claim 1,
wherein a color layer formed of the objects of the same color and information on the objects forming the color layer are associated with each other and registered in the pattern data,
wherein the processor is configured to execute the program to:
select any of the color layer as a determination target, and in the selected color layer, determines on an object basis whether or not an object is sewable, and
select another unsewn color layer as the determination target when an unsewn object whose required bobbin thread amount is less than or equal to a bobbin thread remaining amount is no longer present in the color layer that is a determination target.

4. An embroidery sewing method of a sewing machine performed by a computer, the method comprising:
acquiring pattern data in which information on an object corresponding to a unit from a sewing start point to a ravel preventing point or a thread trimming point and information related to a required bobbin thread amount required for sewing the object are associated with each other and registered, the information on the object and sewing order being associated with each other and registered in the pattern data;
acquiring a bobbin thread remaining amount;
setting one of the objects as a determination target in accordance with the sewing order;
determining whether or not the object of the determination target is sewable, based on a difference between the required bobbin thread amount of the object of the determination target according to the pattern data and the bobbin thread remaining amount, and
excluding the object of the determination target from sewing targets when the object of the determination target is determined not to be sewable, and set another object in the next sewing order as the object of the determination target without warning for a shortage of the bobbin thread.

5. A non-transitory computer readable storage medium storing a computer program for performing the embroidery sewing method of a sewing machine according to claim 4.

6. A sewing machine, comprising:
a memory storing a program; and
a processor configured to execute the program to:
acquire pattern data in which information on an object corresponding to a unit from a sewing start point to a ravel preventing point or a thread trimming point and information related to a required bobbin thread amount required for sewing the object are associated with each other and registered;

acquire a bobbin thread remaining amount;

determine whether or not the object is sewable, based on a difference between the required bobbin thread amount of the object according to the pattern data and the bobbin thread remaining amount; and decide whether or not the object is set as a sewing target based on a determination result of the determination unit; and wherein a color layer formed of the objects of the same color and information on the objects forming the color layer are associated with each other and registered in the pattern data, wherein the processor is configured to execute the program to:

select any of the color layer as a determination target, and in the selected color layer, determines on an object basis whether or not an object is sewable, and select another unsewn color layer as the determination target when an unsewn object whose required bobbin thread amount is less than or equal to a bobbin thread remaining amount is no longer present in the color layer that is a determination target.

\* \* \* \* \*